United States Patent
Zhang et al.

(10) Patent No.: US 9,847,174 B2
(45) Date of Patent: Dec. 19, 2017

(54) CAPACITOR ASSEMBLY AND RELATED METHOD OF FORMING

(71) Applicant: General Electric Company, Schenectady, NY (US)

(72) Inventors: Lili Zhang, Niskayuna, NY (US); Daniel Qi Tan, Rexford, NY (US); Jeffrey S Sullivan, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 99 days.

(21) Appl. No.: 14/964,120

(22) Filed: Dec. 9, 2015

(65) Prior Publication Data

US 2017/0169948 A1    Jun. 15, 2017

(51) Int. Cl.
*H01G 4/258* (2006.01)
*H01G 4/38* (2006.01)
*H01G 4/224* (2006.01)

(52) U.S. Cl.
CPC ............. *H01G 4/258* (2013.01); *H01G 4/224* (2013.01); *H01G 4/38* (2013.01)

(58) Field of Classification Search
None
See application file for complete search history.

(56) References Cited

U.S. PATENT DOCUMENTS

| | | | |
|---|---|---|---|
| 2,479,872 A * | 8/1949 | Seiden | H01G 4/224 174/380 |
| 5,812,365 A | 9/1998 | Jakoubovitch | |
| 5,894,402 A | 4/1999 | Strange et al. | |
| 6,708,757 B2 | 3/2004 | Hebel et al. | |
| 7,235,875 B2 | 6/2007 | Booth et al. | |
| 7,864,506 B2 | 1/2011 | Pal et al. | |
| 8,228,660 B2 | 7/2012 | Fujii et al. | |
| 2014/0377623 A1 * | 12/2014 | Pyzza | H01G 11/10 429/120 |

OTHER PUBLICATIONS

"Thermal Management of Electrolytic Capacitors", Aavid Thermalloy, pp. 1-2, retrieved from "http://www.digikey.com/Web%20Export/Supplier%20Content/Aavid_59/PDF/Aavid_ManagementOfElectrolyticCaps.pdf", retrieved on Dec. 8, 2015.

(Continued)

*Primary Examiner* — Dion R Ferguson
(74) *Attorney, Agent, or Firm* — Nittin N. Joshi

(57) ABSTRACT

A capacitor assembly is disclosed. The capacitor assembly includes a housing. The capacitor assembly further includes a plurality of capacitors disposed within the housing. Furthermore, the capacitor assembly includes a thermally conductive article disposed about at least a portion of a capacitor body of the capacitors, and in thermal contact with the capacitor body. Moreover, the capacitor assembly also includes a heat sink disposed within the housing and in thermal contact with at least a portion of the housing and the thermally conductive article such that the heat sink is configured to remove heat from the capacitor in a radial direction of the capacitor assembly. Further, a method of forming the capacitor assembly is also presented.

23 Claims, 7 Drawing Sheets

(56) References Cited

OTHER PUBLICATIONS

"Heat Dissipation and Cooling for Aluminium Capacitors", retrieved from IPowerGuru—Power Electronics Information Portal, Apr. 9, 2012, "http://www.powerguru.org/heat-dissipation-and-cooling", retrieved on Dec. 8, 2015.

Jankowski et al., "Capacitor Thermal Management for Mobile Power Electronics", SBIR Source, 2014, https://sbirsource.com/sbir/topics/84875-capacitor-thermal-management-for-mobile-power-electronics, retrieved on Dec. 8, 2015.

\* cited by examiner

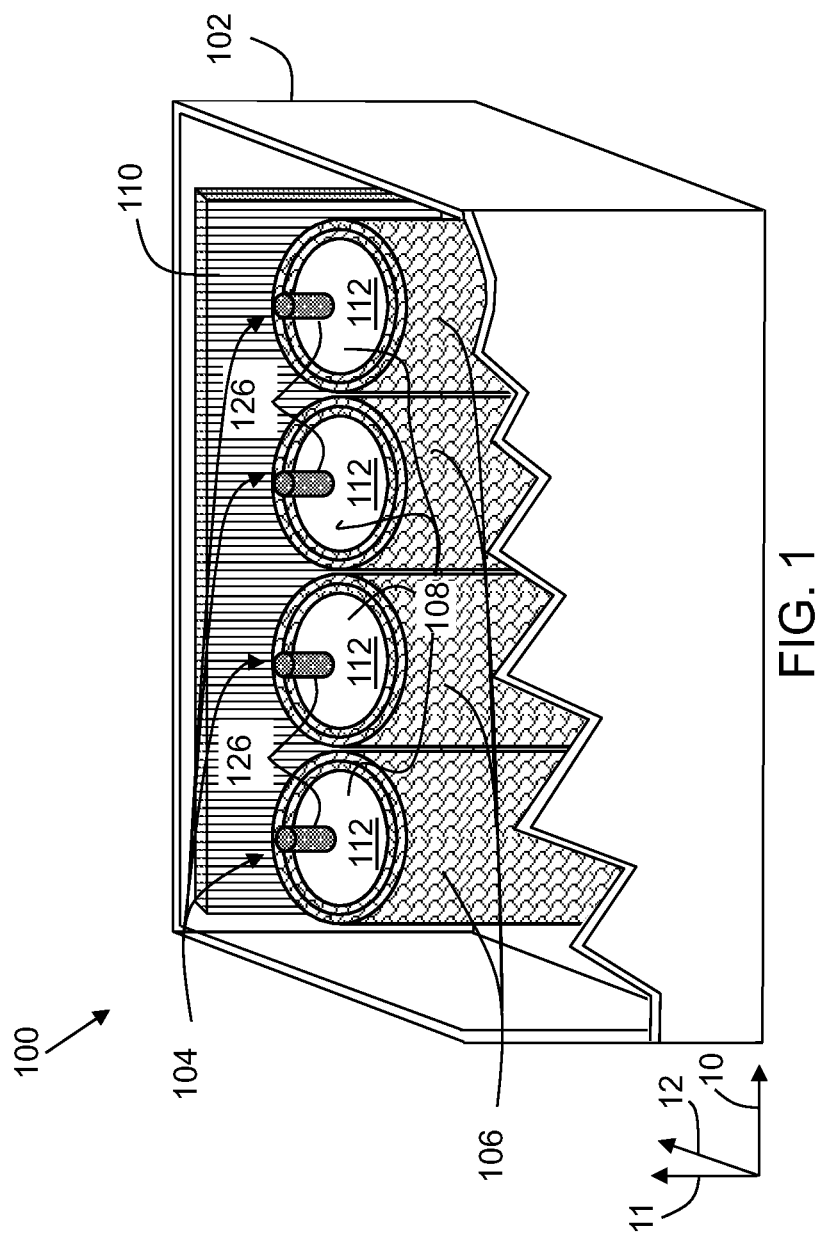

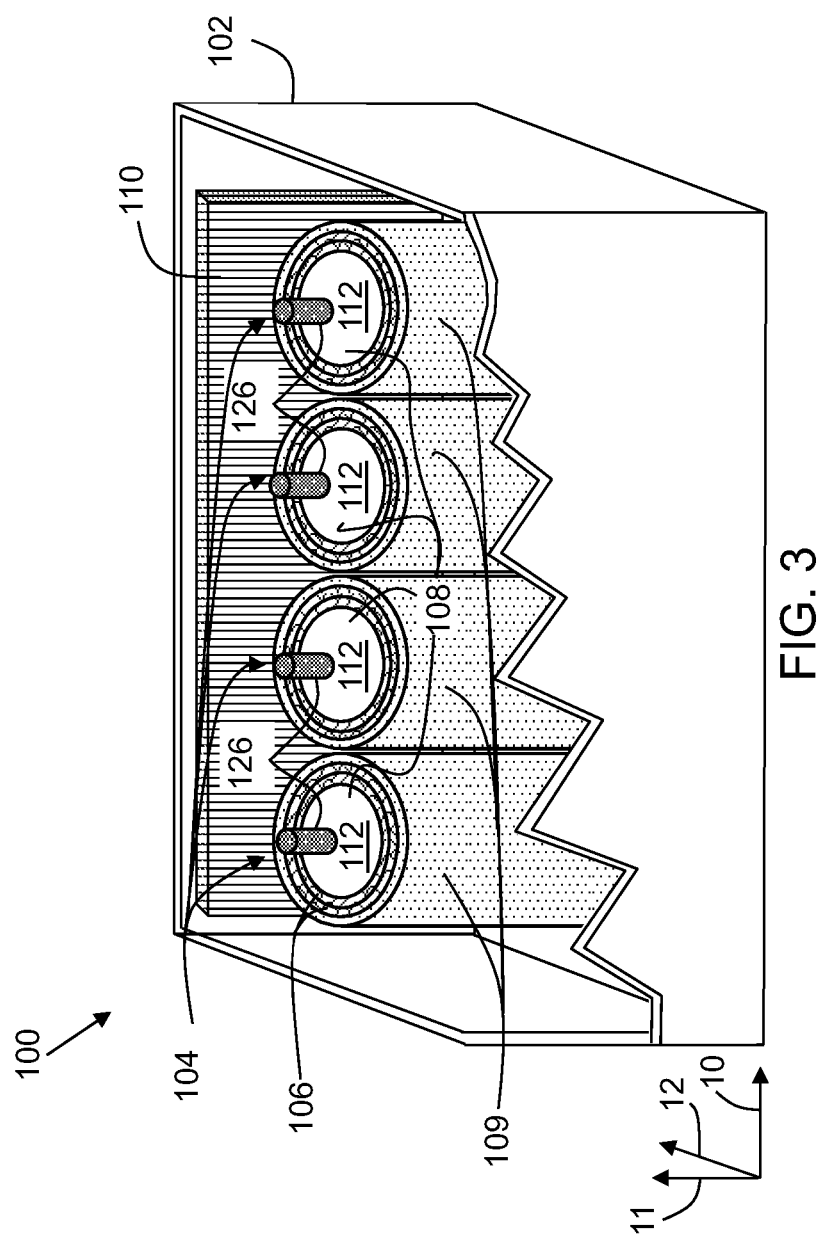

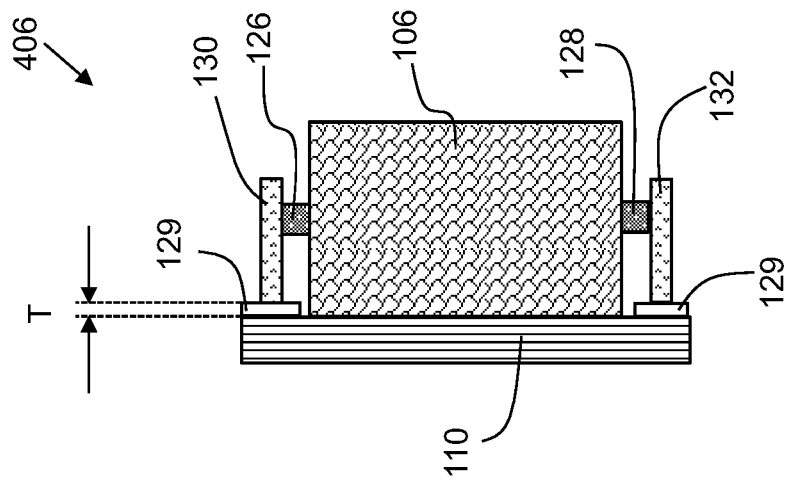
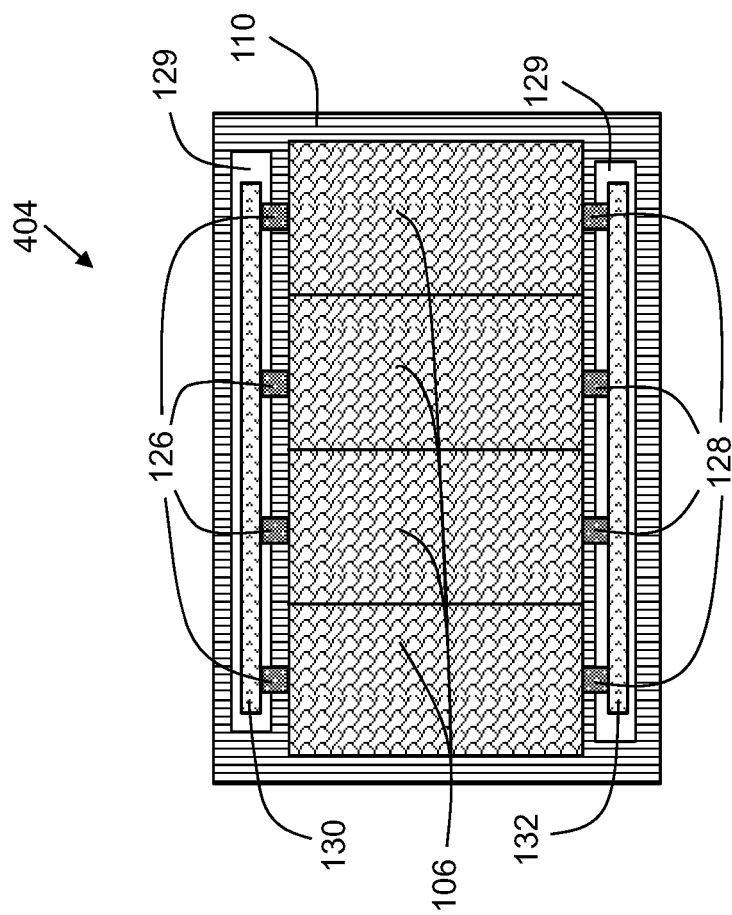
FIG. 4B
FIG. 4C

US 9,847,174 B2

CAPACITOR ASSEMBLY AND RELATED METHOD OF FORMING

STATEMENT REGARDING FEDERALLY SPONSORED RESEARCH AND DEVELOPMENT

This invention was made with Government support under contract number DE-EE0006433 awarded by the U.S. Department of Energy. The Government has certain rights in the invention.

BACKGROUND

Embodiments of the disclosure relate to a capacitor assembly. More particularly, embodiments of the disclosure relate to thermal management of the capacitor assembly and method of forming a capacitor assembly.

Capacitors, at times, need to be operated at increased voltage and current levels. For example, power capacitors are widely used in inverters, typically in a direct current (DC) link of an inverter. Typical rated voltage for such DC-link capacitors ranges from 270 Volts DC to 1100 Volts DC. Additionally, the capacitor is required to deliver current of tens to a few hundred of Amperes.

Therefore, often, a number of capacitors are assembled into a capacitor bank in order to distribute large amplitude of ripple current, or to achieve the desired capacitance. The capacitor bank along with a potting compound is typically encapsulated in a resin to prevent moisture ingress and then sealed in a closed housing, thereby forming a capacitor assembly. Typical potting compounds used in such a capacitor assembly have a thermal conductivity lower than 0.5 W/m-K. Use of such potting compounds severely affects heat transfer capability within the capacitor assembly. Moreover, under high ripple current condition, low thermal conductivity of the potting compound leads to capacitor self-heating. Self-heating of the capacitor typically results in thermal degradation of dielectric materials employed in the capacitor assembly and eventually the failure of the capacitor assembly.

In some instances, the capacitors of the capacitor assembly may be exposed to transient events. For example during starting operation, the capacitor needs to carry significantly higher ripple current compared to normal operating condition. Even though such starting operation does not last for more than a couple of minutes, if the capacitor assembly cannot dissipate heat quickly and effectively, chances of thermal runaway increases.

Therefore, there exists a need for an improved capacitor assembly and methods of forming such a capacitor assembly.

BRIEF DESCRIPTION

One embodiment is directed to a capacitor assembly. The capacitor assembly includes a housing. The capacitor assembly further includes a plurality of capacitors disposed within the housing. Furthermore, the capacitor assembly includes a thermally conductive article disposed about at least a portion of a capacitor body of the capacitors, and in thermal contact with the capacitor body. Moreover, the capacitor assembly also includes a heat sink disposed within the housing and in thermal contact with at least a portion of the housing and the thermally conductive article such that the heat sink is configured to remove heat from the capacitor in a radial direction of the capacitor assembly.

Another embodiment is directed to a capacitor assembly. The capacitor assembly includes a housing. The capacitor assembly further includes a plurality of capacitors disposed within the housing. Furthermore, the capacitor assembly includes a thermally conductive article disposed about at least a portion of a capacitor body of the capacitors, and in thermal contact with the capacitor body. Moreover, the capacitor assembly includes a plurality of electrical conductors disposed in the housing, wherein the capacitor is electrically coupled to the plurality of electrical conductors via a plurality of electrodes. Additionally, the capacitor assembly also includes a heat sink disposed within the housing and in thermal contact with at least a portion of the housing, the thermally conductive article, and the plurality of electrical conductors such that the heat sink is configured to remove heat from the capacitor in both radial and axial directions of the capacitor assembly.

Yet another embodiment is directed to method for forming a capacitor assembly. The method includes disposing a plurality of capacitors, a thermally conductive article, and a heat sink within a housing such that the thermally conductive article is disposed about at least a portion of a capacitor body of the capacitors and in thermal contact with the capacitor body, and the heat sink is disposed in thermal contact with at least a portion of the housing and the thermally conductive article and thereby configured to remove heat from the capacitor in a radial direction of the capacitor assembly.

DRAWINGS

These and other features, aspects, and advantages of the present specification will become better understood when the following detailed description is read with reference to the accompanying drawings in which like characters represent like parts throughout the drawings, wherein:

FIG. 1 is a diagrammatical illustration of a capacitor assembly, in accordance with one embodiment;

FIG. 3 is a diagrammatical illustration of a capacitor assembly, in accordance with one embodiment FIGS. 4A, 4B, and 4C depict a perspective view, an elevation view, and a side view, respectively, of a capacitor assembly, in accordance with one embodiment;

DETAILED DESCRIPTION

Figure 2B:
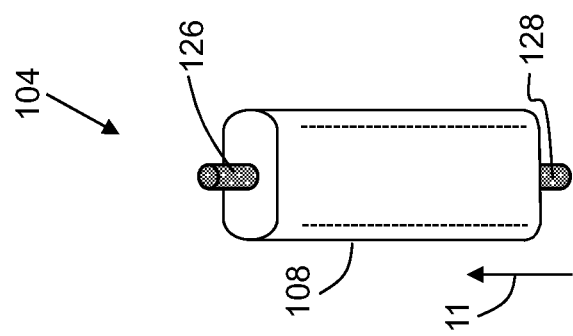
FIG. 2B is a diagrammatical illustration of a capacitor, in accordance with one embodiment.

The specification may be best understood with reference to the detailed figures and description set forth herein. Various embodiments are described hereinafter with reference to the figures. However, those skilled in the art will readily appreciate that the detailed description given herein with respect to these figures is for explanatory purposes as the method and the system may extend beyond the described embodiments.

Unless defined otherwise, technical and scientific terms used herein have the same meaning as is commonly understood by one of ordinary skill in the art to which this disclosure belongs. In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. Here and throughout the specification and claims, range limitations may be combined and/or interchanged; such ranges are identified and include all the sub-ranges contained therein unless context or language indicates otherwise.

Some embodiments are directed to a capacitor assembly. The capacitor assembly includes a housing. The capacitor assembly further includes a plurality of capacitors disposed in the housing. Furthermore, the capacitor assembly includes a thermally conductive article disposed around a capacitor body of a capacitor in the plurality of capacitors, and in thermal contact with the capacitor body. Moreover, the capacitor assembly also includes a heat sink disposed within the housing and in thermal contact with the housing and the thermally conductive article such that the heat sink is configured to remove heat from the capacitor in a radial direction. Further, some embodiments are also directed to a method for forming the capacitor assembly.

FIG. 1 is a diagrammatical illustration of a capacitor assembly 100, in accordance with one embodiment. In some embodiments, the capacitor assembly 100 may be characterized by an axial direction 10 and a radial direction 12. The capacitor assembly 100 of FIG. 1, in some embodiments, includes a housing 102, a plurality of capacitors 104, a thermally conductive article 106, and a heat sink 110 disposed within the housing 102. A reference numeral 11 represents an axial direction of the capacitor 104. The configuration of the capacitor assembly 100 of FIG. 1 may facilitate cooling of the capacitor assembly 100 in the radial direction 12 of the capacitor assembly 100, in some embodiments. The arrangement of the thermally conductive article 106 and the heat sink 110 facilitates cooling of a substantial portion of the capacitors 104.

In FIG. 1, the housing 102 is shown in a partial manner, for example, with a partial front wall and without a top side wall, for better visibility of internal elements, such as, the plurality of capacitors 104, the thermally conductive article 106, and the heat sink 110. Further, although the housing 102 is shown as having a rectangular shape in FIG. 1, the housing 102 of other shapes is also envisioned. Additionally, in some embodiments, the housing 102 may also include one or more access holes (not shown) for facilitating electrical contact of one or more of the plurality of capacitors 104 with any external electronic circuit (not shown). Suitable material of the housing 102 includes a thermally conductive material. Non-limiting examples of the thermally conductive material may include aluminum, copper, iron, boron nitride, aluminum nitride, silicon nitride, silicon carbide, oxide ceramic, or combinations thereof. Non-limiting examples of the oxide ceramic may include aluminum oxide ($Al_2O_3$), beryllium oxide (BeO), magnesium oxide (MgO), titanium oxide ($TiO_2$), cubic spinel ($MgAl_2O_4$), quartz ($SiO_2$), strontium aluminate ($SrAl_2O_4$), strontium titanate ($SrTIO_3$), non-oxide diamond, or combinations thereof.

In some embodiments, the plurality of capacitors 104 may be disposed within the housing 102. The capacitor 104 may be a film capacitor, for example, a wound film capacitor. Without limiting the scope of the present specification, other types of capacitors may also be employed. Further, only four capacitors 104 are shown in FIG. 1 for illustration, however, greater or fewer numbers of capacitors may be disposed in the housing 102. Furthermore, although the capacitors 104 are shown as being arranged in a single row in the housing 102, the capacitors 104 may be arranged in a plurality of rows or any other suitable patterns without limiting the scope of the present specification. Moreover, although the capacitors 104 are shown as being vertically disposed in FIG. 1, horizontal or angular placement of the capacitors 104 is also envisioned (embodiment not shown in Figures). In some embodiments, while some of the capacitors 104 are disposed vertically, some capacitors may also be disposed horizontally (embodiment not shown in Figures). In some embodiments, some of the capacitors 104 may be disposed at an angle with respect to the axial direction 10 of the capacitor assembly 100 (embodiment not shown in Figures).

Figure 2A:
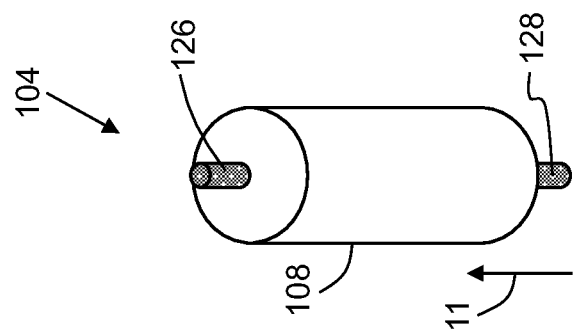
FIG. 2A is a diagrammatical illustration of a capacitor, in accordance with one embodiment.

In the description hereinafter, for ease of illustration, various embodiments may be explained with reference to a single capacitor 104. It is to be noted that the embodiments and details may also be applicable to other capacitors with or without modifications. For example, FIG. 2A is a diagrammatical illustration of the capacitor 104, in accordance with one embodiment. The capacitor 104 may include a body 108, hereinafter referred to as a capacitor body 108, and a plurality of electrodes 126 and 128. The term "capacitor body" as used herein refers to a portion of the capacitor 104 except for the electrodes 128. For example, the capacitor body may include a plurality of layers (conductive and dielectric) disposed on a core (see FIG. 4A). Moreover, although the capacitor body 108 having a cylindrical shape of a circular cross-section is shown in FIGS. 1 and 2A, capacitor body of another shape (e.g., a cylindrical shape of any other cross-section) is also envisioned (see FIG. 2B). FIG. 2B is a diagrammatical illustration of the capacitor 104, in accordance with one embodiment. Example capacitor 104 of FIG. 2B includes a cylindrical capacitor body 108 having a flat cross-section (e.g., rectangle with curved sides).

Referring again to FIG. 1, the capacitor assembly 100 may further include a thermally conductive article 106 disposed about at least a portion of the capacitor body 108 of the capacitors 104, and in thermal contact with the capacitor body 108. The term "thermal contact" as used herein refers to an interface between connecting objects such that the interface is capable of transferring heat from one object to another or vice-versa.

In some embodiments, the thermally conductive article 106 may be disposed around the capacitor body 108 such that the capacitor body 108 is partially surrounded by the thermally conductive article 106. In some embodiments, the thermally conductive article 106 may be disposed around the capacitor body 108 such that the capacitor body 108 is substantially surrounded or fully surrounded by the thermally conductive article 106. The term "substantially surrounded" as used herein refers to an arrangement of the thermally conductive article 106 such that at least 60% of a surface of the capacitor body 108 is surrounded by the thermally conductive article 106.

In some embodiments, as depicted in FIG. 1, the thermally conductive article 106 includes a foil including a thermally conductive material. For example, one or more layers (two shown in FIG. 1) of the foil may be wrapped around the capacitor body 108. One or more layers of the foil may be wrapped around the capacitor body 108 such that one or more layers of the foil are in thermal contact with the capacitor body 108. In one embodiment, one or more layers of the foil may be disposed in direct contact with the capacitor body 108 to form the thermal contact therebetween. In another embodiment, the one or more layers of the foil may be disposed in thermal contact with the capacitor body 108 via an additional thermally conductive material disposed therebetween. Some non-limiting examples of the thermally conductive material of the foil may include aluminum, copper, iron, boron nitride, aluminum nitride, silicon nitride, silicon carbide, oxide ceramic, or combinations thereof. Non-limiting examples of the oxide ceramic may include aluminum oxide ($Al_2O_3$), beryllium oxide (BeO), magnesium oxide (MgO), titanium oxide ($TiO_2$), cubic spinel ($MgAl_2O_4$), quartz ($SiO_2$), strontium aluminate ($SrAl_2O_4$), strontium titanate ($SrTiO_3$), non-oxide diamond, or combinations thereof.

Furthermore, the capacitor assembly 100 may include a heat sink 110 disposed within the housing 102 and in thermal contact with at least a portion of the housing 102 and the thermally conductive article 106 such that the heat sink 110 is configured to substantially remove heat from the capacitor 104 in the radial direction 12 of the capacitor assembly 100, as shown in FIG. 1. The term "radial direction 12" as used herein may refer to a direction perpendicular or substantially perpendicular to the axial direction 11 of the capacitor 104. As depicted, the heat sink 110 is disposed on one side wall of the housing 102 and in thermal contact with at least one side of the capacitor body 108 having the thermally conductive article 106. For example, the heat may be removed from the capacitor 104 in the radial direction 12 via the surface of the capacitor body 108.

In one embodiment, the heat sink 110 may be disposed in direct contact with the thermally conductive article 106 to form the thermal contact therebetween (visible in FIG. 4C). In another embodiment, the heat sink 110 may be disposed in thermal contact with the thermally conductive article 106 via an additional thermally conductive material disposed therebetween (embodiment not shown in Figures). Moreover, in FIG. 1, although the heat sink 110 is shown as being disposed adjacent to a single wall (e.g., a rear wall of the housing 102), the heat sink 110 may also be disposed adjacent to one or more walls of the housing 102, such as the sides, top or bottom without limiting the scope of the present specification.

Non-limiting examples of heat sink 110 materials may include aluminum, copper, iron, boron nitride, aluminum nitride, silicon nitride, silicon carbide, oxide ceramic, or combinations thereof. Non-limiting examples of the oxide ceramic may include aluminum oxide ($Al_2O_3$), beryllium oxide (BeO), magnesium oxide (MgO), titanium oxide ($TiO_2$), cubic spinel ($MgAl_2O_4$), quartz ($SiO_2$), strontium aluminate ($SrAl_2O_4$), strontium titanate ($SrTiO_3$), non-oxide diamond, or combinations thereof.

In some embodiments, the heat sink 110 may include one or more extended portions or protrusions (not shown). The heat sink 110 may be disposed such that the extended portions or protrusions remain in thermal contact with the thermally conductive article 106. In certain embodiments, one or more extended portions of the heat sink 110 may be in thermal contact with an interface between the thermally conductive articles 106 of adjacent capacitors 104.

In some embodiments, the heat sink 110 may include a phase change material. For example, the heat sink 110 may be formed of the phase change material or the heat sink 110 may include the phase change material that is combined with one or more thermal conductive materials. The term phase change material as used herein refers to a material capable of melting and solidifying at a certain temperature and is capable of storing and releasing thermal energy. Typically, the phase change material absorbs or releases thermal energy when the phase change material changes its state from solid to liquid and vice versa. Non-limiting examples of the phase change material may include solders such as, but not limited to, InSn-based Indalloy 1E (capable of being melt at temperatures of about 117° C.), InAg-based Indalloy 164 (capable of being melt at temperatures of about 154° C.), InPb-based Indalloy 204 (capable of being melt at temperatures of about 175° C.), and BiSn-based Indalloy 281 (capable of being melt at temperatures of about 138° C.) that are commercialized by Indium Corporation®. Further, other non-limiting examples of the phase change material may include organic material-based phase change materials such as, but not limited to, savE®HS89 (capable of being melt at temperatures of about 89° C.) from Pluss®, PureTemp® 151 (capable of being melt at temperatures of about 151° C.) from PureTemp®, Paraffin 33-Carbon (capable of being melt at temperatures of about 75.9° C.), and Hydrated Salt-based PlusICE including A118 (capable of being melt at temperatures of about 118° C.) and A164 (capable of being melt at temperatures of about 164° C.).

During operation of the capacitor assembly 100, there may be two types of heat generation from the capacitors 104, for example, a transient heat and a steady state heat. It is to be noted that ripple current may flow through the capacitors 104 during operation. Sometimes, during a starting operation, a magnitude of the ripple current may be higher (e.g., greater than three times) in comparison to a magnitude of the ripple current during a normal operation. For example, in situations (e.g., the starting operation) when increased ripple current flows through the capacitors 104, the temperature of the capacitors 104 may suddenly rise. Such transient or surge (for example, the sudden increase) in the temperature of the capacitor assembly 100 may be referred to as the transient heat. Whereas, the generation of the heat during normal operating condition of the capacitors 104 is referred to as the steady-state heat.

Such heat (one or both of the steady-state heat and the transient heat) is radially transferred to the thermally conductive article 106 from the capacitor body 108. The heat may further be transferred radially to the heat sink 110 via the thermally conductive article 106, and the heat sink 110 may further transfer the heat to the housing 102.

In another embodiment, the thermally conductive article 106 may further include a heat pipe (see FIG. 3). FIG. 3 is a diagrammatical illustration of the capacitor assembly 100, in accordance with one embodiment. It is to be noted that the capacitor assembly 100 of FIG. 3 includes certain elements similar to the capacitor assembly 100 of FIG. 1 and hence, not described in detail. In the configuration of FIG. 3, a heat pipe 109 may be disposed in thermal contact with the thermally conductive article 106 and the heat sink 110. The heat pipe 109 may include a hollow body including a thermally conductive material. The hollow body may include a cooling fluid. While at least some portion of the hollow body may be thermally coupled to the capacitor body 108, at least some other portion of the hollow body may be thermally coupled to the heat sink 110. During operation, due to the heat (one or both of the steady-state heat and the transient heat) received by the heat pipe 109 at an interface between the capacitor body 108 and the heat pipe 109, the cooling fluid may turn into a vapor by absorbing the heat from the hollow body of the heat pipe 109. The vapor then travels along the heat pipe 109 to the heat sink 110 and condenses back into a liquid, thereby releasing the heat. The liquid then returns to the interface, and the cycle repeats.

Figure 4A:
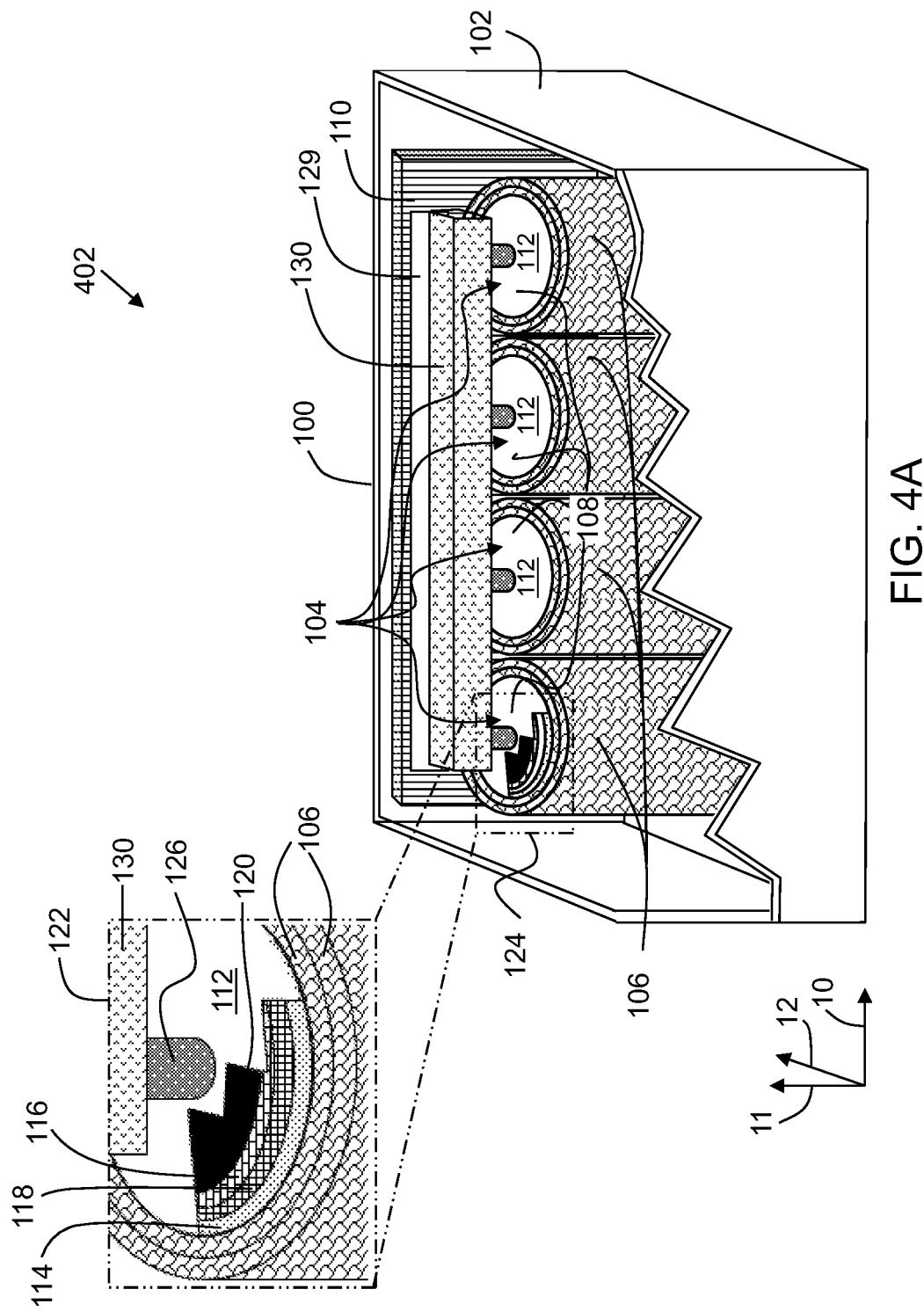

FIGS. 4A, 4B, and 4C depict a perspective view 402, an elevation view 404, and a side view 406, respectively, of the capacitor assembly 100, in accordance with one embodiment. More particularly, for ease of illustration, the elevation view 404 and the side view 406 are presented without housing 102. In some embodiments, the configuration of the capacitor assembly 100 of FIG. 4A facilitates cooling of the capacitor assembly 100 in both the axial direction 10 and the radial direction 12 of the capacitor assembly 100. For sake of brevity, some of the details of the elements already described in FIG. 1 are not repeated herein.

As previously noted, the capacitor 104 includes the capacitor body 108. An enlarged view 122 of a region 124 of the capacitor assembly is presented in FIG. 4A. In some embodiments, the capacitor body 108 may optionally include a casing 112 which is, for illustration purpose, shown in a partially open form in the enlarged view 122. Further, in some embodiments, the capacitor body 108 may also include one or more electrically conductive layers 114, 116, and a dielectric layer 118 disposed alternatively, as depicted in FIG. 4A. The one or more electrically conductive layers 114, 116 and the dielectric layer 118 may be disposed on a thermally conductive or a thermally non-conductive core 120 (top end of which is shown in FIG. 4A). The one or more electrically conductive layers 114, 116, the dielectric layer 118, and the core 120, at least partially, may be encapsulated by the casing 112. Further, as previously noted, the thermally conductive article 106 is disposed around the capacitor body 108 of the capacitor 104, and in thermal contact with the capacitor body 108. In the embodiments shown in enlarged view 122 of FIG. 4A, the thermally conductive article 106 is disposed in direct contact with the electrically conductive layer 114.

The capacitor 104 may further include a plurality of electrodes 126, 128 (see FIGS. 4B and 4C). In some embodiments, the plurality of electrodes 126, 128 may be in electrical contact with the electrically conductive layers 114, 116, respectively. The plurality of electrodes 126, 128 may include an electrically conductive material such as metal.

In some embodiments, as depicted in FIGS. 4A-4C, the capacitor assembly 100 may further include a plurality of electrical conductors 130, 132 (sometimes also referred to as busbars) disposed in the housing 102, wherein the capacitor 104 is electrically coupled to the plurality of electrical conductors 130, 132. More particularly, the capacitor 104 may be electrically coupled to the plurality of electrical conductors 130, 132 via the plurality of electrodes 126, 128. Moreover, the capacitors 104 may be electrically coupled to each other via the plurality of electrical conductors 130, 132. In some embodiments, as depicted in FIGS. 4A and 4B, the capacitors 104 may be coupled in parallel with one another. In some embodiments, all the capacitors 104 may be coupled in series. In some alternative embodiments, while some of the capacitors 104 may be coupled in parallel, some may be coupled in series. The plurality of electrical conductors 130, 132 may be electrically connectable to an external electric circuit (not shown), for example, via one or more openings in the housing 102.

Further, in some embodiments, the heat sink 110 may be disposed within the housing 102 such that the heat sink 110 is in thermal contact with the housing 102, the thermally conductive article 106, and the plurality of electrical conductors 130, 132. Therefore the heat sink 110 may be configured to remove heat from the capacitor 104 in both the radial direction 12 and the axial direction 10 of the capacitor assembly 100.

It may be desirable to avoid any electric contact between the capacitors 104 (e.g., with the plurality of electrodes 126, 128) and the heat sink 110. Therefore, in some embodiments, the heat sink 110 may include a coating 129 (shown in FIGS. 4B and 4C) including a dielectric material. The thermal contact between the electrical conductors 130, 132 and the heat sink 110 may be facilitated via the dielectric material of the coating 129. Such a coating, in some embodiments, may have high thermal conductivity leading to improved heat transfer. Non-limiting examples of suitable dielectric material may include titanium oxide. In some embodiments, the thickness (T) of the coating 129 may be in the range from about 1 micron to 200 microns for minimized thermal resistance and reliable electrical insulation performance. In some embodiments, the thickness (T) of the coating 129 may be in the range from about 5 microns to 100 microns for minimized thermal resistance and reliable electrical insulation performance. Moreover, for illustration purpose in FIGS. 4A-4C, the coating 129 is shown partially disposed on the heat sink 110. However, the coating 129 may be disposed on the entire surface of the heat sink 110 without limiting the scope of the present specification.

Figure 5:
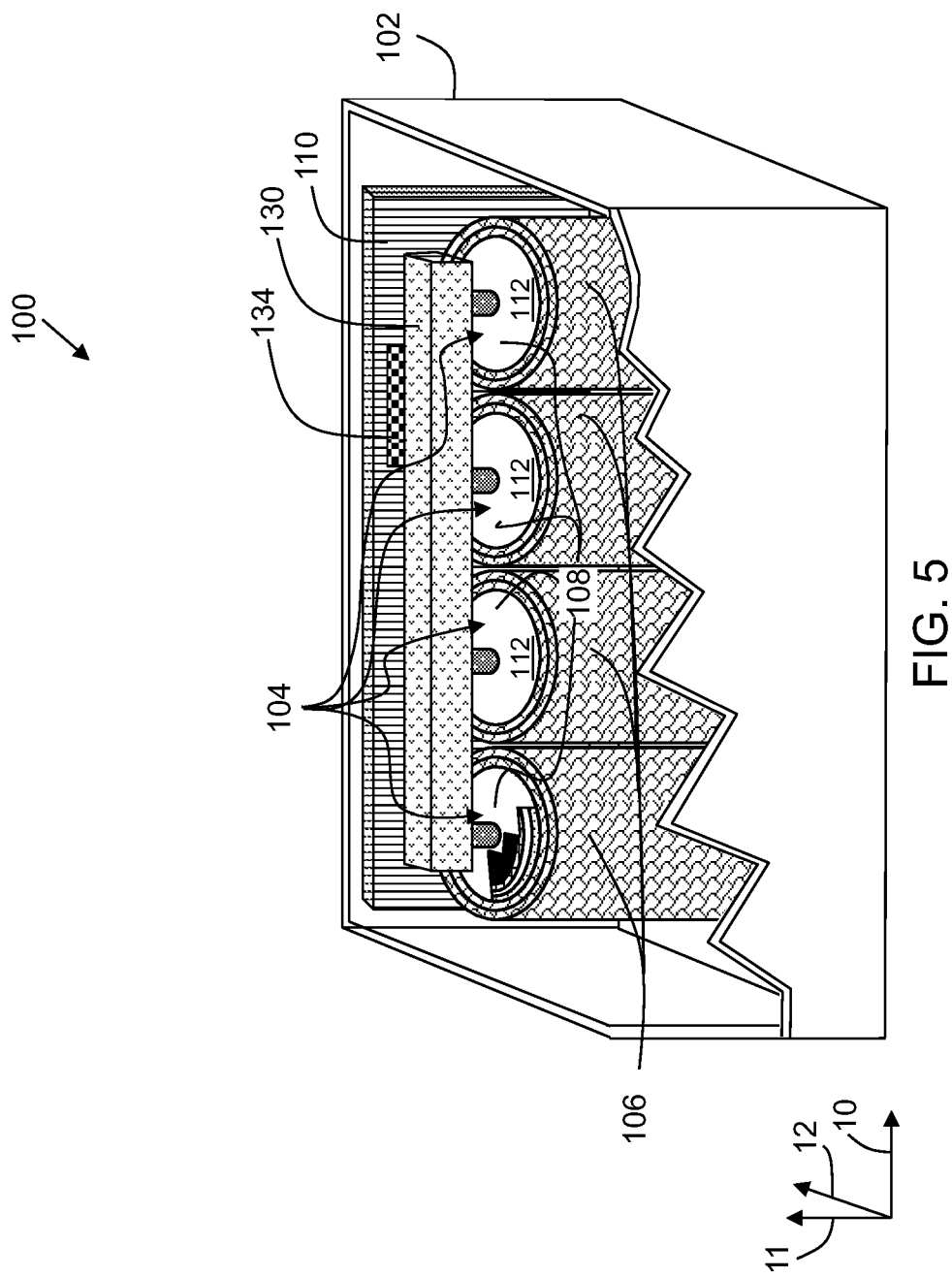
FIG. 5 is a diagrammatical illustration of a capacitor assembly, in accordance with one embodiment.

Furthermore, in some alternative embodiments, for aiding thermal conduction between the electrical conductors 130, 132, the thermally conductive article 106, and the heat sink 110, the capacitor assembly 100 may include a thermally conductive shim (see FIG. 5). FIG. 5 is a diagrammatical illustration of a capacitor assembly 100, in accordance with one embodiment. It is to be noted that the capacitor assembly 100 of FIG. 5 includes certain elements similar to the capacitor assembly 100 of FIG. 1 and hence, not described in detail. As depicted in FIG. 5, in some embodiments, the capacitor assembly 100 may include a thermally conductive shim 134 disposed in thermal contact between the thermally conductive article 106 and the heat sink 110. In some embodiments, the thickness of the thermally conductive shim 134 may be in the range of a few microns to 100 microns, for example, 1 to 200 microns.

Non-limiting examples of thermally conductive shim 134 materials may include AlN, BN, $Al_2O_3$, $TiO_2$, titania coated aluminum metal sheet, MgO, and DLC (diamond-like carbon coating). Moreover, in some embodiments, the thermally conductive shim 134 may be coated with a dielectric material such as, but not limited to, zirconium oxide, titanium oxide coated aluminum metal sheet, DLC, or combinations thereof, to avoid electrical contact between the thermally conductive article 106 and the heat sink 110. The embodiments of the present specification are not limited with respect to the shape of the thermally conductive shim 134. Also, although only one thermally conductive shim 134 is depicted in FIG. 5, more than one thermally conductive shim 134 may also be employed.

Further, in some embodiments, the capacitor assembly 100 may include both the coating 129 and the thermally conductive shim 134 (embodiment not shown in Figures). In such a configuration, the thermally conductive shim 134 may not include the coating of the dielectric material.

Referring again to FIGS. 4A-4C and 4, the heat (e.g., the transient heat, the steady state heat, or both) may be radially transferred to the heat sink 110 via the thermally conductive article 106. Further, the heat may be axially transferred to the heat sink 110 via the plurality of electrical conductors 130, 132 (through the coating 129, the thermally conductive shim 134, or both). Therefore, the thermal management configurations in accordance with some embodiments of the invention may advantageously allow for heat transfer through both the capacitor body 108 (e.g., heat conduction in the radial direction 12 of the capacitor assembly 100) and the electrodes 126, 128 (e.g., heat conduction in the axial direction 10 of the capacitor assembly 100).

Further, as mentioned earlier, the heat sink may include a phase change material. In such instances, because of the material properties of the phase change material of the heat sink 110, the transient heat may be absorbed by the phase change material. For example, the phase change material may be capable of storing and releasing such thermal energy. The thermal energy may be absorbed or released when the phase change material changes from solid to liquid and vice versa, for example. Moreover, the steady state heat may be at least partially dissipated or transferred to the housing 102 by the heat sink 110.

In some embodiments, further cooling of the capacitor assembly 100 may be facilitated by external cooling mechanism (not shown), via natural airflow or assisted air flow, without limiting the scope of the present specification.

Some embodiments are directed to a method for forming the capacitor assembly 100. The method may include disposing the plurality of capacitors 104, the thermally conductive article 106, and the heat sink 110 in the housing 102 such that the thermally conductive article 106 is disposed around the capacitor body 108 of the capacitor 104 in the plurality of capacitors 104 and in thermal contact with the capacitor body 108, and the heat sink 110 is disposed in thermal contact with the housing 102 and the thermally conductive article 106 and thereby configured to remove heat from the capacitor 104 in a radial direction 12 of the capacitor assembly 100.

In some embodiments, disposing the plurality of capacitors 104, the thermally conductive article 106, and the heat sink 110 may include disposing the plurality of capacitors 104 in the housing and thereafter disposing the thermally conductive article 106 around the capacitor body 108 of the capacitors 104. In particular embodiments, the thermally conductive article 106 is disposed in thermal contact with the capacitor body 108 of the capacitors 104. Thereafter, the heat sink 110 may be disposed in the housing 102 such that the heat sink 110 is in thermal contact with the thermally conductive article 106 and the housing 102.

In some embodiments, disposing the plurality of capacitors 104, the thermally conductive article 106, and the heat sink 110 may include disposing the thermally conductive article 106 around the capacitor body 108 of the capacitors 104 and in thermal contact with the capacitor body 108 of the capacitors 104. Thereafter, the heat sink 110 may be disposed such that the heat sink 110 is in thermal contact with the thermally conductive article 106. Subsequently, the plurality of capacitors 104, the thermally conductive article 106, and the heat sink 110, thus arranged, are disposed in the housing 102 such that the heat sink 110 is in thermal contact with the housing 102.

In some embodiments, disposing the plurality of capacitors 104, the thermally conductive article 106, and the heat sink 110 may include disposing the heat sink 110 in the housing 102 such that the heat sink 110 is in thermal contact with the housing 102. Further, the thermally conductive article 106 may be disposed in the housing 102 such that thermally conductive article 106 is in thermal contact with the heat sink 110. Thereafter, the plurality of capacitors 104 may be disposed in the housing 102 such that the capacitor body 108 of the capacitors 104 is in thermal contact with the thermally conductive article 106.

Figure 6:
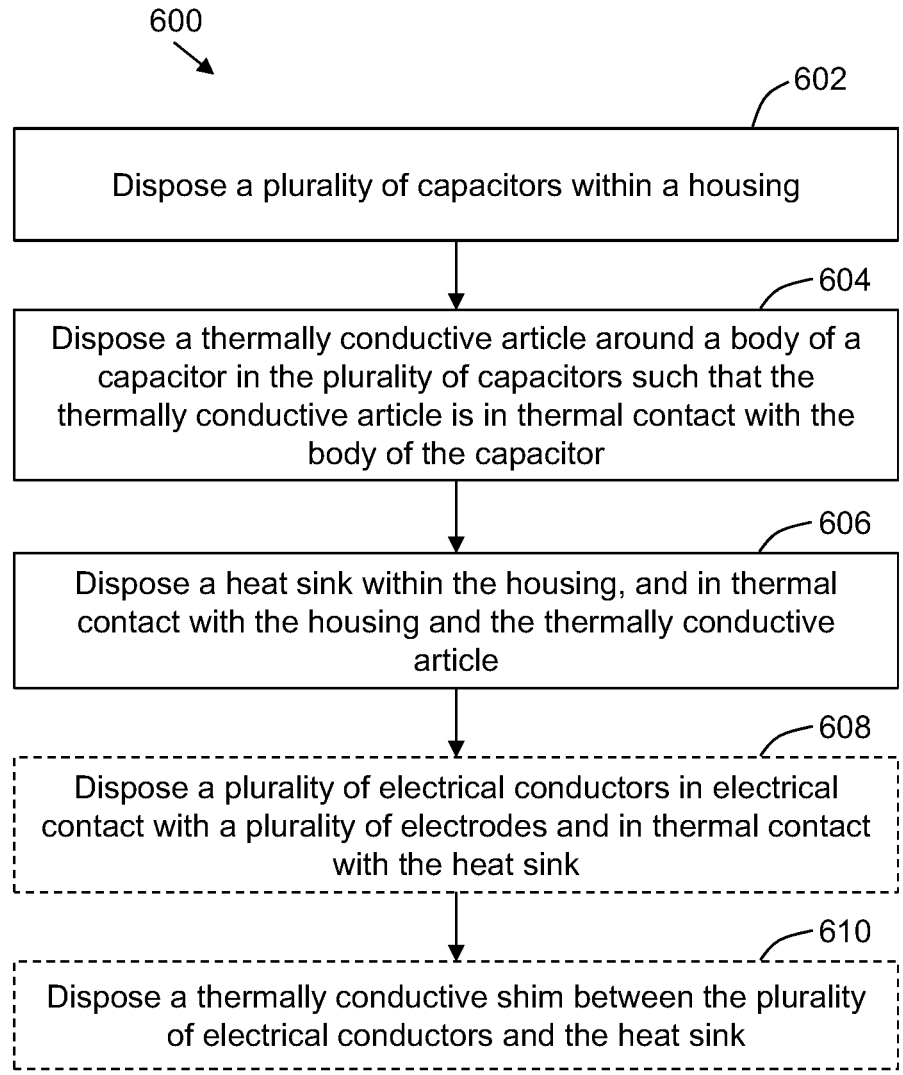
FIG. 6 depicts a flowchart illustrating a method for forming a capacitor assembly, in accordance with one embodiment.

It is to be noted that, sequences of the method steps performed in the embodiments described hereinabove are for illustration only. Although not described above, other suitable sequences of steps are also contemplated. In one non-limiting example, FIG. 6 depicts a flowchart illustrating a method 600 for forming a capacitor assembly (100 or 200), in accordance with one embodiment. For ease of illustration, the method 600 is described in conjunction with the FIGS. 1, 2A-2B, and 4A-4C.

In some embodiments, the method 600, at step 602, may include disposing the plurality of capacitors 104 within the housing 102. For example, the plurality of capacitors 104 may be disposed in the housing 102 in a single row (see FIG. 1). In other non-limiting examples, the plurality of capacitors 104 may be disposed in a plurality of rows or other suitable pattern, without limiting the scope of the present specification.

Further, the method 600, at step 604, may include disposing the thermally conductive article 106 around the capacitor body 108 of the capacitor 104 in the plurality of capacitors 104 such that the thermally conductive article 106 is in thermal contact with the capacitor body 108. In some embodiments, disposing the thermally conductive article 106 may include inserting the thermally conductive article 106 between the capacitor body 108 and the heat sink 110. In some embodiments, disposing the thermally conductive article 106 may include wrapping the thermally conductive article 106 around the capacitor body 108. Moreover, in some embodiments, disposing the thermally conductive article 106 may include disposing the thermally conductive article 106 in direct contact with the capacitor body 108 thereby forming a thermal contact therebetween. In some embodiments, disposing the thermally conductive article 106 may include disposing a thermally conductive material between the thermally conductive article and the capacitor body 108 thereby forming a thermal contact between the thermally conductive article 106 and the capacitor body 108.

Furthermore, the method 600, at step 606, may include disposing the heat sink 110 within the housing 102 and in thermal contact with the housing 102 and the thermally conductive article 106 such that the heat sink 110 is configured to remove heat from the capacitor 104 in the radial direction 12 of the capacitor assembly 100. In some embodiments, disposing the heat sink 110 may include disposing the heat sink 110 in direct contact with the thermally conductive article 106 and the housing 102 thereby forming a thermal contact therebetween. In some embodiments, disposing the heat sink 110 may include disposing a thermally conductive material between the heat sink 110 and the housing 102, between the heat sink 110 and the thermally conductive article 106, or both.

Optionally, in some embodiments, at step 608, the method 600 may include disposing the plurality of electrical conductors 130, 132 in electrical contact with the plurality of electrodes 126, 128 of the capacitor 104 and in thermal contact with the heat sink 110. With such a configuration of the capacitor assembly 100 where the plurality of electrical conductors 130, 132 are in thermal contact with the heat sink 110, the heat from the capacitors 104 may also be transferred in the axial direction 10 of the capacitor assembly 100.

Also, optionally, in some embodiments, at step 610, the method 600 may include disposing a thermally conductive shim between the plurality of electrical conductors 130, 132 and the heat sink 110.

Advantageously, the capacitor assembly 100, in accordance with some embodiments, is capable of maintaining the capacitors 104 employed therein at lower temperatures. More particularly, the heat from the capacitor 104 may be conducted away from the capacitor body 108, the electrodes 128, 128, or both the capacitor body 108 and the electrodes 128, 128, thereby resulting in improved cooling of the capacitor 104. Additionally, use of the phase change material in some embodiments in the heat sink 110 aids in mitigating the transient heat. As a result of the abovementioned one or more heat transfer mechanisms, the useful life of the capacitor assembly 100 may be improved.

The present disclosure has been described in terms of some specific embodiments. They are intended for illustration only, and should not be construed as being limiting in any way. Thus, it should be understood that modifications can be made thereto, which are within the scope of the disclosure and the appended claims.

It will be appreciated that variants of the above disclosed and other features and functions, or alternatives thereof, may be combined to create many other different systems or applications. Different implementations of the systems and methods may perform some or all of the steps described herein in different orders, parallel, or substantially concurrently. Various unanticipated alternatives, modifications, variations, or improvements therein may be subsequently made by those skilled in the art and are also intended to be encompassed by the following claims.

The invention claimed is:

1. A capacitor assembly, comprising:
a housing;
a plurality of capacitors disposed within the housing;
a thermally conductive article disposed about at least a portion of a capacitor body of the plurality of capacitors, and in thermal contact with the capacitor body; and
a heat sink disposed within the housing and in thermal contact with at least a portion of the housing and the thermally conductive article, wherein the thermally conductive article is configured to transfer heat from the capacitor body to the heat sink in a radial direction of the capacitor assembly and the heat sink is configured to transfer heat from the thermally conductive article to the housing in the radial direction of the capacitor assembly.

2. The capacitor assembly of claim 1, further comprising a plurality of electrical conductors disposed in the housing, wherein the plurality of capacitors is electrically coupled to the plurality of electrical conductors, and wherein the heat sink is thermally coupled to the plurality of electrical conductors such that the heat sink is further configured to remove heat from the plurality of capacitors in an axial direction of the capacitor assembly.

3. The capacitor assembly of claim 2, wherein each capacitor of the plurality of capacitors comprises a plurality of electrodes electrically coupled to the plurality of electrical conductors.

4. The capacitor assembly of claim 1, wherein the thermally conductive article comprises a foil.

5. The capacitor assembly of claim 4, wherein the thermally conductive article further comprises a heat pipe.

6. The capacitor assembly of claim 1, wherein the heat sink comprises a coating comprising a dielectric material.

7. The capacitor assembly of claim 1, further comprising a thermally conductive shim disposed in thermal contact between the thermally conductive article and the heat sink.

8. The capacitor assembly of claim 1, wherein the heat sink comprises a phase change material.

9. The capacitor assembly of claim 1, wherein the heat sink is disposed on a side wall of the housing.

10. The capacitor assembly of claim 9, wherein the side wall is perpendicular to the radial direction of the of the capacitor assembly.

11. The capacitor assembly of claim 7, wherein the thermally conductive shim comprises AlN, BN, Al2O3, TiO2, titania coated aluminum metal sheet, MgO, or diamond-like carbon coating (DLC).

12. The capacitor assembly of claim 7, wherein a thickness of the thermally conductive shim is in a range of 1 to 200 microns.

13. The capacitor assembly of claim 7, further comprising a coating of zirconium oxide, titanium oxide coated aluminum metal sheet, DLC, or combinations thereof, disposed on the thermally conductive shim.

14. The capacitor assembly of claim 6, wherein a thickness of the coating is in a range of 5 to 100 microns and the dielectric material comprises titanium oxide.

15. A capacitor assembly, comprising:
a housing;
a plurality of capacitors disposed within the housing;
a thermally conductive article disposed about at least a portion of a capacitor body of the plurality of capacitors, and in thermal contact with the capacitor body;
a plurality of electrical conductors disposed in the housing, wherein the plurality of capacitors is electrically coupled to the plurality of electrical conductors via a plurality of electrodes; and
a heat sink disposed within the housing and in thermal contact with at least a portion of the housing, the thermally conductive article, and the plurality of electrical conductors, wherein the thermally conductive article is configured to transfer heat from the capacitor body to the heat sink in a radial direction of the capacitor assembly, and wherein the heat sink is configured to transfer heat from the thermally conductive article to the housing in the radial direction of the capacitor assembly and transfer heat from the plurality of electrical conductors to the housing in an axial direction of the capacitor assembly.

16. The capacitor assembly of claim 15, wherein the thermally conductive article comprises a foil.

17. The capacitor assembly of claim 16, wherein the thermally conductive article further comprises a heat pipe.

18. The capacitor assembly of claim 15, wherein the heat sink comprises a coating comprising a dielectric material.

19. The capacitor assembly of claim 15, further comprising a thermally conductive shim disposed in thermal contact between the thermally conductive article and the heat sink.

20. The capacitor assembly of claim 15, wherein the heat sink comprises a phase change material.

21. A method for forming a capacitor assembly, comprising: disposing a plurality of capacitors, a thermally conductive article, and a heat sink within a housing such that the thermally conductive article is disposed about at least a portion of a capacitor body of the plurality of capacitors and in thermal contact with the capacitor body, and the heat sink is disposed in thermal contact with at least a portion of the housing and the thermally conductive article such that the thermally conductive article is configured to transfer heat from the capacitor body to the heat sink in a radial direction of the capacitor assembly and the heat sink is configured to transfer heat from the thermally conductive article to the housing in the radial direction of the capacitor assembly.

22. The method of claim 21, wherein each capacitor of the plurality of capacitors comprises a plurality of electrodes, and wherein the method further comprises disposing a plurality of electrical conductors in the housing such that the plurality of electrical conductors is in electrical contact with the plurality of electrodes and in thermal contact with the heat sink.

23. The method of claim 22, further comprising disposing a thermally conductive shim between the plurality of electrical conductors and the heat sink.

* * * * *